D. K. OSBOURN.

PAPER BOXES.

No. 7,295. Reissued Sept. 5, 1876.

Witnesses:
H. J. England.
W. T. Hutchinson

Inventor:
David K. Osbourn
by W. W. J. Howard
Atty.

UNITED STATES PATENT OFFICE.

DAVID K. OSBOURN, OF BALTIMORE, MARYLAND.

IMPROVEMENT IN PAPER-BOXES.

Specification forming part of Letters Patent No. 170,639, dated November 30, 1875; reissue No. 7,295, dated September 5, 1876; application filed June 22, 1876.

*To all whom it may concern:*

Be it known that I, DAVID K. OSBOURN, of the city of Baltimore, State of Maryland, have invented a new and Improved Paper-Box, of which the following is a specification, reference being had to the accompanying drawing, forming a part hereof.

The box is intended more particularly as a receptacle for water-closet paper, and is constructed in a manner admitting of the withdrawal of the sheets of paper one by one, as hereinafter described.

The invention consists, first, of the blank of which the box is formed; and, secondly, of the box formed from said blank.

Figure 1:
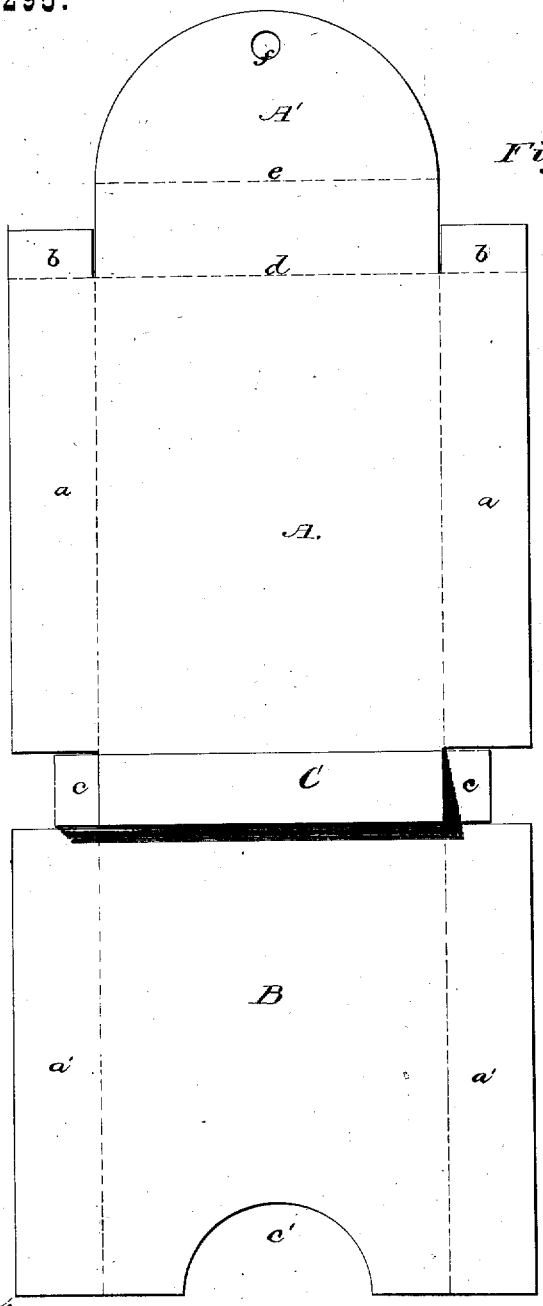
Figure 2:
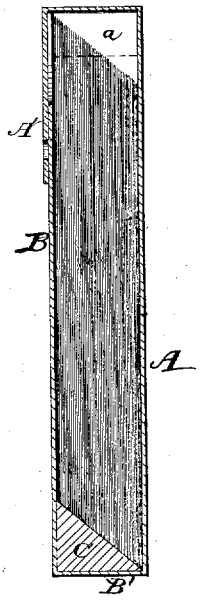

In the accompanying drawing, Figure 1 represents a top view of the box-blank, and Fig. 2 a vertical transverse section of the paper-box closed.

The box-blank, as seen in Fig. 1, comprises the back portion A, the suspensory-extension A′ connected thereto; the front portion B, the rectangular part B′ connecting the back and front; the flaps *a* on the back A, and flaps *a′* on the front B; and the small flaps *b* and *c*, placed, respectively, upon the upper ends of the flaps *a* and on the ends of the connecting rectangular part B′. The small flaps *b* and *c* may, however, be omitted, if preferred. The front B is preferably cut out as shown at *c*. When the box-blank is closed in the form of a box, it appears as shown in section in Fig. 2, an adhesive material being used to connect the several parts which are brought together, the rectangular part B′ forming the base, and that portion embraced between the dotted lines *d* and *e* the top of the box when it is closed. A block, C, of rectangular triangular cross-section, of a length equal to the inner width of the box, forms the bottom thereof, the different sheets of the water-closet paper or other contents of the box rising gradually from the rear to the front thereof upon the inclined plane of the said block, facilitating the removal of the sheets one by one, as desired. The purpose of the semicircular cut *c′* is to assist in their removal by admitting the thumb to the front of the sheet to be withdrawn. The bottom block serves also to stiffen the box, and render the same more durable. The extension A′ is preferably perforated at *f* for purposes of suspension.

The box thus formed is useful as a cover for the contents in shipping, and also as a receptacle for the same for use in water-closets, chambers, offices, &c., or as a general stationary case.

I am aware that metallic ticket-boxes having an inclined partition and apertures similar to that marked *c* have been used, and that similar ones have been made by molding *papier-maché;* but none have been made of paper from a blank such as is here described, or provided with an extension, A′, and a block stiffening at the bottom.

Having described my invention, I claim as new and wish to secure by Letters Patent of the United States—

1. A paper-box blank, consisting of the edge-flapped back and front A and B, the latter having the cut *c′*, the rectangular connecting part B′, and suspensory-extension A′, substantially as shown and described.

2. A paper-box provided with the extended back A A′ and bottom-stiffening block C, as and for the purposes described.

3. As a new article of manufacture, a top-flap-closing paper-box, having the suspensory-perforation *f*, the cut *c′*, and the rectangular triangular bottom-stiffening block C, as described.

In testimony whereof I have hereunto subscribed my name this 4th day of March, A. D. 1876.

DAVID K. OSBOURN.

Witnesses:

C. A. WAGNER,

GEO. H. HOWARD.